March 13, 1962
W. D. ALLISON
3,025,078
LOAD COMPENSATING SPRING SUSPENSION FOR VEHICLES
Filed Sept. 7, 1954
2 Sheets-Sheet 1
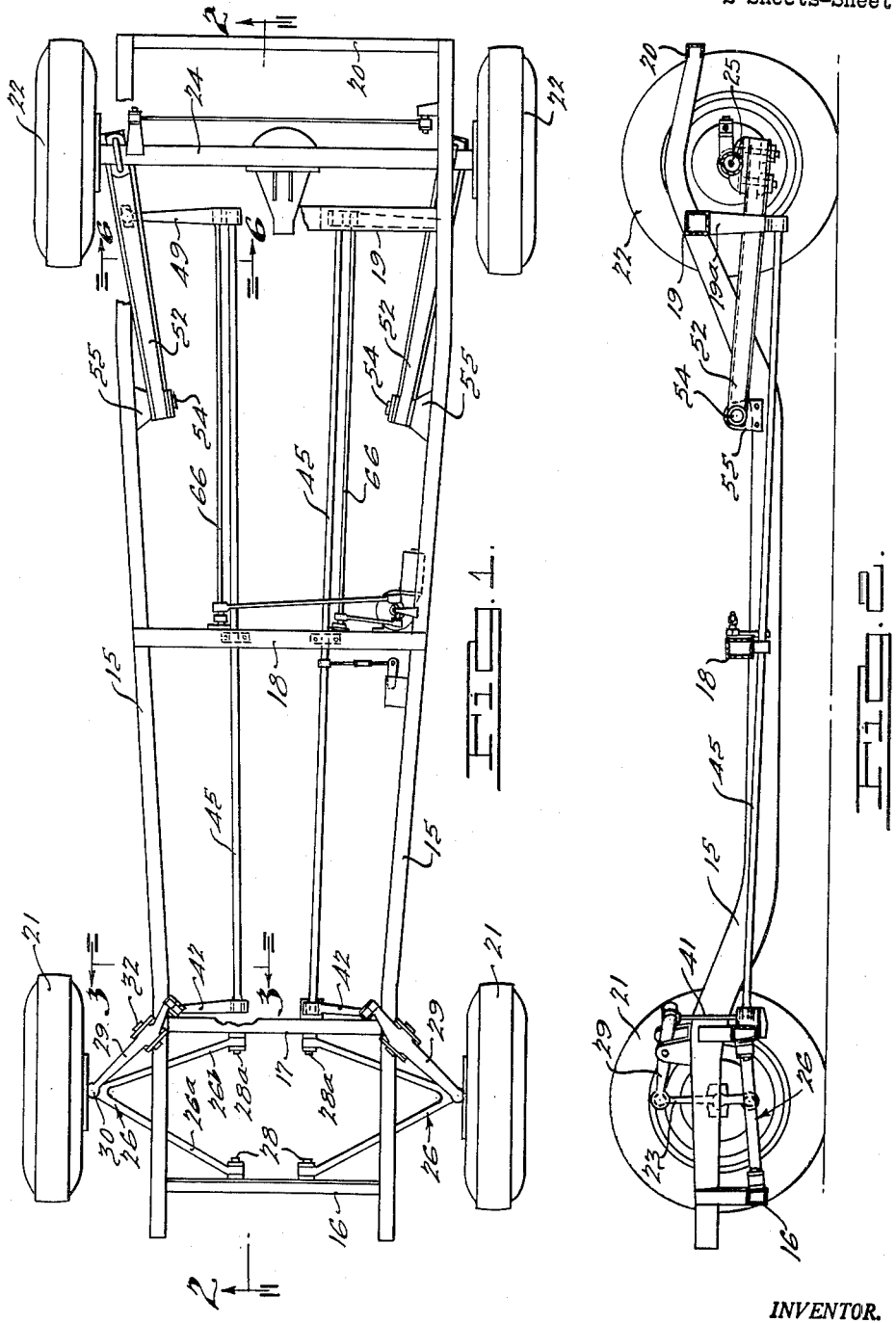
INVENTOR.
William D. Allison.
BY
Elmer Jamison Gray
ATTORNEY.

March 13, 1962
W. D. ALLISON
3,025,078
LOAD COMPENSATING SPRING SUSPENSION FOR VEHICLES
Filed Sept. 7, 1954
2 Sheets-Sheet 2
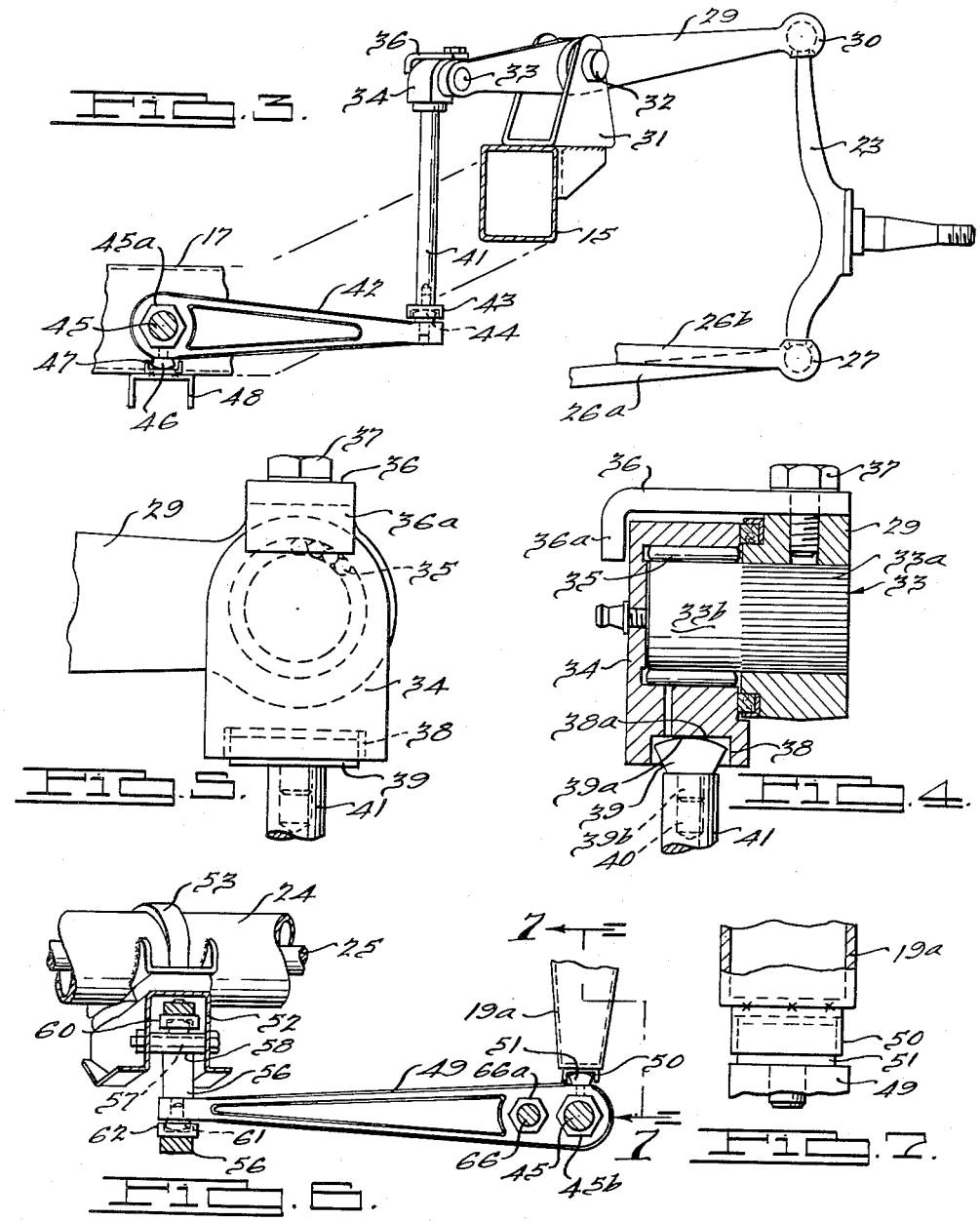
INVENTOR.
William D. Allison
BY
Elmer Jamieson Gray
ATTORNEY.

United States Patent Office 3,025,078
Patented Mar. 13, 1962

3,025,078
LOAD COMPENSATING SPRING SUSPENSION
FOR VEHICLES
William D. Allison, 39 Radnor Circle,
Grosse Pointe, Mich.
Filed Sept. 7, 1954, Ser. No. 454,492
14 Claims. (Cl. 280—124)

This invention relates to motor vehicles and particularly to spring suspensions therefor. The invention is applicable to various types of motor vehicles such as automobiles of the so-called pleasure or passenger types, busses, trucks, ambulances and commercial vehicles. For the purposes of illustration the invention has been shown herein as embodied in a motor vehicle having a chassis or frame structure adapted to be utilized in a passenger or pleasure type vehicle.

One of the principal objects of the invention is to provide a spring suspension for a motor vehicle capable of providing smooth riding characteristics under various conditions of vehicle operation, maintaining the vehicle substantially level at all times, increasing the comfort of the passengers regardless of tough roads over which the vehicle may travel, and rendering the vehicle relatively safe to handle on curves and over rough terrain while also reducing materially stresses and strains to which the frame is subjected under operating conditions.

In the illustrated embodiment of the present invention the spring suspension embodies a main spring means, preferably torsion bar or torsional spring means, connecting a front and a rear wheel at each side of the vehicle in such manner as to enable vertical forces to be transmitted in corresponding directions to the vehicle frame adjacent opposite ends thereof in response to vertical motion of either wheel.

In the embodiment herein illustrated the front wheels are supported by upper and lower swinging suspension arms or levers to provide for independent front wheel motion. Although the rear wheels are shown as being supported by a solid-type axle it will be understood that they may also be supported for independent motion, such as by means of swing axles or swinging suspension arms. The main spring suspension, which is shown as comprising torsional spring means, such as a longitudinally extending torsion bar common to each pair of front and rear wheels at a side of the vehicle, is connected to the front and rear wheels by means of swinging levers or lever arms which, as shown, are attached to the front and rear of the torsion bar and extend laterally or outwardly therefrom in the same direction. One feature of the illustrated embodiment resides in the connection of one of the swinging levers or lever arms at one end of the vehicle preferably the lever attached to the front of the torsion bar, to the inner end of the upper wheel suspension arm which in turn is pivoted intermediate its ends to the frame. The swinging lever or lever arm attached to the main torsion bar at the opposite end of the frame may be connected to the associated wheel such as by means of a swinging torque arm. By virtue of the foregoing construction the front and rear levers or lever arms, attached to the main torsion bar, will respond to vertical displacement of the wheels and will provide for displacement of opposite ends of the frame in corresponding directions upon vertical displacement of one wheel or the other.

Other objects of this invention will appear in the following description and appended claims, reference being had to the accompanying drawings forming a part of this specification wherein like reference characters designate corresponding parts in the several views.

FIG. 1 is a fragmentary plan view of a motor vehicle chassis provided with a vehicle spring suspension constructed in accordance with the present invention.

FIG. 2 is a longitudinal sectional view taken substantially through lines 2—2 of FIG. 1 looking in the direction of the arrows.

FIG. 3 is an enlarged fragmentary sectional view taken substantially through lines 3—3 of FIG. 1 looking in the direction of the arrows.

FIG. 4 is an enlarged fragmentary vertical section, partly in elevation, showing the connecting means between the front upper suspension arm and the vertical load transmitting link.

FIG. 5 is a fragmentary side elevation of the construction shown in FIG. 4, this view being taken in the direction of the lefthand side of FIG. 4.

FIG. 6 is an enlarged fragmentary transverse sectional elevation taken substantially through lines 6—6 of FIG. 1 looking in the direction of the arrows.

FIG. 7 is a fragmentary vertical section taken substantially through lines 7—7 of FIG. 6 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings there is illustrated, by way of example, a vehicle chassis having road wheels supporting the frame or body through the medium of a spring suspension which in the present embodiment is preferably of the torsional or torsion bar kind. In the interest of clarity the vehicle superstructure or body and details of the power plant and driven mechanisms have been largely omitted from the drawings. As illustrated, the chassis or body frame is shown, by way of example, as comprising spaced longitudinal sills or main side frame members 15 of box-like tubular construction rigidly connected together by means of suitable cross frame members 16, 17, 18, 19 and 20, the front cross frame members 16 and 17 being of drop-type construction. The vehicle is provided with a pair of front dirigible wheels 21 and a pair of rear driven wheels 22. Each front wheel, see FIG. 3, is carried by any conventional type of upright spindle support 23. The rear wheels 22 are connected together in the present embodiment by means of a solid type tubular axle 24 through which extend the drive shafts 25 for the rear wheels, see FIGS. 1 and 6.

Each front wheel 21 is supported for independent up and down movement by means of upper and lower swinging suspension arms or levers. The lower relatively long suspension arm or lever 26 is preferably of wish-bone or fork-like construction pivotally connected at its outer end at 27 to the lower end of the spindle support or carrier 23. The longitudinally spaced inner ends of the lower suspension lever arm 26 are pivotally connected at 28 and 28a to the frame members 16 and 17, respectively. The upper relatively short suspension lever arm 29 is pivotally connected at its outer end at 30 to the upper end of the spindle support or carrier 23. This upper suspension lever arm 29 extends from its outer pivotal connection 30 inwardly and rearwardly with respect to the lower suspension arm 26, it being noted from a consideration of FIG. 1 that the upper suspension arm extends at an oblique angle with respect to the lower suspension arm. Thus, as distinguished from conventional practice the upper suspension arm or lever 29 angles rearwardly and does not lie in the same central plane as the lower suspension arm. The upper suspension arm or lever 29 for each front wheel extends above and crosses the adjacent frame member 15. The lever arm passes between the upright sides of a U-shaped bracket 31 attached at its bottom, as by welding, to the frame member 15, see FIG. 3. The lever arm 29 is pivotally connected to this bracket by a transverse pivot pin or stud 32 thereby permitting the lever arm to swing up and down about the axis of the pivot pin.

It will be noted that the axis of swinging of each upper suspension arm or lever 29 is angularly disposed with respect to the axis of swinging of the lower suspension arm. Each upper lever 29 extends inwardly of its pivot 32 to provide a lever arm portion having a transverse hole in its inner terminal end into which extends a transverse pivot pin or stud 33. This pin or stud has at one end a knurled portion 33a pressed into the hole in the inner end of the lever 29. The pivot pin 33 has a smooth end portion 33b extending within an opening or socket in a bearing cap 34, needle bearings 35 being interposed between the portion 33b and the annular wall of the socket in the bearing cap. Overlying the inner end of the lever 29 and the bearing cap 34 is a retainer plate 36 serving as a safety guard and having a bent end portion 36a overlapping the face of the bearing cap 34. The retainer guard 36 is secured to the upper end of the lever 29 by means of a bolt 37.

The lower end of the bearing cap 34, see FIGS. 4 and 5, is provided with an elongate rectangular cup-shaped socket 38 having a flat upper bearing wall 38a. An elongate hardened bearing member or stud 39 having flared sides projects into the elongate socket 38. The bearing member or stud 39 is formed with an upper arcuate bearing surface 39a having rolling engagement with the flat upper bearing wall 38a of the socket. Since the bearing member 39 extends the major length of the socket 38 it will have line contact with the bearing wall 38a, thereby enabling relatively high loads to be sustained as compared with a construction in which the bearing member only has a point contact with the bearing surface of the socket. The bearing member 39 has a depending pilot portion 39b press fitted into a hole 40 in the upper end of a vertical strut or load transmitting link 41. From the foregoing it will be seen that the upper end of each strut 41 has a pivotal connection with the inner end of each upper suspension arm or lever 29 providing rolling engagement between the surfaces 38a and 39a in a direction at right angles to the lever 29. This rolling engagement permits a limited relative angular displacement between the strut 41 and the lever 29. On the other hand, the needle bearings 35 between the stud 33 and the bearing cap 34 permit relative angular displacement of the lever and strut in the direction of the vertical plane thereof over a relatively wide angle. The foregoing construction provides in effect a universal joint action between the upper end of the strut 41 and the inner end of the suspension lever 29. The lower end of each vertical strut or transmitting link 41 has a rolling pivotal connection with the outer end of a lever arm 42 preferably similar to the rolling pivotal connection at the upper end of the strut. This lower pivotal connection, as shown in FIG. 3, comprises a cup-shaped socket member 43 rigidly pinned in a hole in the lower end of the strut 41. A bearing member or stud 44, similar to the stud 39, is rigidly pinned in a hole in the outer end of the lever arm 42. The bearing member 44 also has an arcuate bearing surface having rolling engagement with the upper flat wall of the socket in the member 43, thereby providing at this point a rolling anti-friction bearing between the lower end of the strut 41 and the outer end of the lever arm 42.

The main spring suspension for the vehicle comprises a main longitudinal torsion bar 45 connected to the front and rear wheels 21 and 22 at each side of the vehicle. The main torsion bars 45 may, as desired, be of solid or tubular construction and when installed are initially stressed or deflected by winding or twisting them angularly a predetermined amount up to, for example, 90° to 120° so as to support the sprung weight of the vehicle. As illustrated in FIGS. 1 and 2, the forward ends of the main torsion bars 45 terminate proximate to the rear side of the cross frame member 17. The forward end of each main torsion bar is upset to provide an enlarged hex portion 45a, see FIG. 3, splined or keyed within a correspondingly shaped socket or opening in the inner end of the associated lever arm 42. By this construction the inner end of each lever arm 42 is fixed to the forward end of the associated main torsion bar. The inner end of each lever arm is supported on the frame in such manner as to provide a rolling pivotal connection between the inner end of the lever arm and the frame.

The pivotal connection between the inner end of each lever 42 and the frame of the vehicle is preferably similar to the pivotal connection between the outer end of the lever arm and the lower end of the strut 41 and also similar to the rolling pivotal connection between the upper end of the strut 41 and the bearing cap 44, the parts forming this pivotal connection at the inner end of the lever arm, however, being reversed with respect to the corresponding parts at the outer end of the lever arm. Rigidly pinned into a hole in the bottom of the enlarged inner end of the lever 42 immediately below the connection between the main torsion bar 45 and the lever is a bearing member or stud 46 similar to the bearing member 39. This bearing member or stud 46 is housed within a cup-shaped socket member 47 having a flat bottom bearing surface against which an arcuate bearing surface on the member 46 has rolling engagement, similarly to the rolling engagement between the bearing member 39 and the flat bearing wall of the socket 38. The socket member 47 is welded to the top of a channel bracket 48 which in turn is welded to the bottom of the frame cross member 17.

In view of the foregoing described connection between the forward end of each main torsion bar 45 and the adjacent front wheel 21, it will be understood that upward vertical motion or displacement of the front wheel will be transmitted from the spindle support 23 to the outer end of the upper suspension lever 29, thereby swinging this end upwardly. Since the lever 29 is pivoted intermediate its ends at 32 to the frame, the inner end of the lever 29 will swing downwardly and this motion will be transmitted through the strut or transmitting link 41 to the outer end of the lever arm 42 thereby swinging this end in a downward direction. This downward swinging motion of the lever arm 42 will twist or torsionally deflect angularly the forward end of the main torsion bar 45. Since the main torsion bars, as pointed out above, are torsionally pre-wound or pre-twisted when installed, they at all times exert torsional forces on the outer end of the lever 42 tending to swing these ends of the levers upwardly thereby exerting constant forces in upward directions on the struts 41. The reaction points from these forces at the inner ends of the levers 42 are at the localities of the pivotal connections of the levers to the frame, namely, at the localities of the rolling engagement between the bearing members 46 and the socket members 47. Due, therefore, to the restoring action of the main torsion bars, which are at all times under torsional stress, the outer end of each lever 42 will swing upwardly when the corresponding front wheel is displaced in a downward direction, this upward motion of the outer end of the lever at its connection with the strut 41 being accompanied by a degree of torsional unwinding or untwisting of the forward end of the main torsion bar.

The rear ends of the main torsion bars 45 are also upset to provide enlarged hex end portions 45b which are splined or keyed within correspondingly shaped sockets or openings in the inner ends of rear lever arms 49, see FIG. 6, which as shown in FIG. 1 extend laterally in opposite directions from the main torsion bars 45. The inner end of each lever or lever arm 49 is pivotally connected to the lower end of a depending frame member or bracket 19a which is rigidly attached at its upper end to the frame cross member 19. The lower end of each frame bracket 19a carries a cup like socket member 50 similar to the socket member 43. Rigidly pinned in the inner end of each lever 49 at a locality immediately above the connection of the main torsion bar to the lever is a bearing member or stud 51 similar to the bearing member or stud 44. The upper arcuate surface of the stud 51 has rolling engagement with the upper flat surface of the socket member 50. It will be noted that the pivotal connection between the inner end of each lever 49 and the associated frame bracket 19a, providing rolling engagement between the members 50 and 51, is similar to the pivotal connection between the outer end of lever 42 and the transmitting strut or link 41.

With the rear wheels 22 connected by means of axle 24 I prefer to provide a pair of rearwardly diverging torque arms 52 attached at their rear ends as by means of yokes 53 to the outer ends of the axle 24 and pivotally connected at their forward ends at 54 to brackets 55 carried by the main frame members 15. The outer end of each rear lever or lever arm 49 is operatively connected to one of the torque arms 52. This connection between the outer end of each lever 49 and the associated torque arm 52 is illustrated in FIG. 6 and is accomplished through the medium of a yoke shaped hanger bracket 56 secured by means of bolts 57 and spacer plate 58 to torque arm 52. Secured to the plate 58 is a bearing member or stud, similar to the bearing member 39, provided with an upper arcuate bearing surface having rolling engagement with the flat upper surface of a cup shaped socket member 60 similar to the socket member 38. The socket member 60 is rigidly pinned to the upper side of the bracket or yoke 56. It will be noted that the outer end of each rear lever arm 49 projects into the lower end of yoke or bracket 56 above the lower side thereof. This outer end of the lever arm bears on the lower side of the yoke or bracket through the medium of a rolling pivotal connection. This pivotal connection comprises a bearing member or stud 61, similar to the bearing member 46, rigidly pinned in the outer end of the lever 49 and having a lower arcuate bearing surface in rolling engagement with the bottom flat surface of a cup shaped socket member 62, similar to the socket member 47, which is rigidly pinned in the lower side of the yoke or bracket 56.

It will be noted that the swinging levers or lever arms 42 and 49 attached respectively to the front and rear ends of each main torsion bar 45 extend in the same direction outwardly from the main torsion bar. However, due to the levers 29 pivoted intermediate their ends on the frame member 15 and connecting the front wheels through vertical struts 41 with the outer ends of the front levers 42, it will be understood that the levers 42 and 49 at each side of the vehicle will torsionally deflect angularly or twist the associated torsion bar 45 in opposite directions in response to corresponding vertical motions of the front and rear wheels. In other words, up and down movement of a front wheel or a rear wheel will result in angular torsional deflection of the main torsion bar 45 in directions opposite to the angular torsion deflection thereof produced by corresponding up and down movement of the other wheel at the same side of the vehicle. As a consequence, either arm or lever 42 or 49 is effective to torsionally deflect angularly the torsion bar 45 in opposition to the other arm or lever, thereby to transmit vertical forces in corresponding directions to the frame adjacent opposite ends thereof in response to vertical motion of either wheel. Thus for example, when the rear wheel 22 is displaced upwardly, thereby tending to elevate the rear end of the frame, the rear end of the torsion bar 45 will through lever 49 be twisted or torsionally deflected angularly in a direction so as to exert a force tending to swing the front suspension arm 42 upwardly and the outer end of the lever 29 downwardly to depress the front wheel. Since the outer end of the lever 29 is held against downward movement by the front wheel the net result is to raise the front end of the frame in a direction corresponding to the direction in which the rear end of the frame is raised by the upward movement of the rear wheel. The corresponding vertical displacements of the front and rear of the frame thus result in maintaining the frame as well as the body of the vehicle substantially level. The reverse operation, of course, occurs when a front wheel is displaced vertically relative to the rear wheel at the same side of the vehicle.

From the foregoing it will be seen that both front and rear ends of each torsion bar spring 45 will be simultaneously turned or deflected angularly substantially in corresponding amounts when the front and rear wheels successively pass over a change in elevation, resulting in substantially equivalent vertical movements in the same directions being transmitted to opposite ends of the vehicle body and chassis. The spring suspension will therefore be effective to maintain the chassis and vehicle body substantially level regardless of vertical movement of the front and rear wheels. Of course, it will be understood that when the front and rear wheels are simultaneously elevated or lowered both ends of the vehicle chassis and body will be raised or lowered substantially equal distances. It is important to note that the total vertical forces due to a change in elevation of either a front or rear wheel at one side of the vehicle are absorbed and divided equally between the front and rear of the interconnecting torsion bar 45. This results in providing an average spring rate of the present spring suspension which will be approximately one-half the spring rate of a conventional automobile.

It will be understood that vertical swinging motion of the rear levers 49 is responsive to vertical swinging motion of the torque arms 52 which, being connected at their rear ends to the rear axle 24, will respond to vertical motion of the rear wheels. It will also be understood that the levers 49 may be otherwise connected at their outer ends to the rear wheels so as to swing up and down in response to corresponding motions of the rear wheels.

The main spring suspension comprising the torsion bars 45 is supplemented by compensating means 66, preferably spring means of the torsional kind, at each side of the vehicle operable to vary or modify the spring effort or resistance of the main spring means so as to maintain the frame substantially level under conditions where changes in static load occur at one end or the other of the vehicle. Since the load compensating means forms no part of the invention to which the claims are now directed a further description thereof is not deemed necessary.

I claim:

1. In a vehicle structure having frame means and front wheels, upper and lower swingable suspension arms pivotally connected at their outer ends at vertically spaced points to each wheel, means for pivotally connecting the inner end of each lower suspension arm to the frame means, means for pivotally connecting each upper suspension arm at a point intermediate the ends thereof to the frame means, the upper suspension arm extending from its outer end angularly in a rearward direction and being inclined downwardly from its outer end toward its inner end and the axis of swinging of the inner end of the lower suspension arm being reversely inclined, longitudinal torsional spring means for each wheel, and connecting means for connecting the inner end of each upper suspension arm to the associated torsional spring means thereby to torsionally deflect the latter in response to vertical motion of the wheel.

2. In a vehicle structure having frame means and front wheels, upper and lower swingable suspension arms pivotally connected at their outer ends at vertically spaced points to each wheel, means for pivotally connecting the inner end of each lower suspension arm to the frame means, means for pivotally connecting each upper suspension arm at a point intermediate the ends thereof to the frame means, longitudinal torsional spring means for each wheel, and connecting means for connecting the inner end of each upper suspension arm to the associated torsional spring means thereby to torsionally deflect the latter in response to vertical motion of the wheel, said connecting means comprising a lever arm attached at its inner end to said spring means, and a vertical link having a pivotal connection at its lower end with the outer end of the lever arm and having a pivotal connection at its upper end with the inner end of the upper suspension arm, at least one of said pivotal connections providing for rolling engagement between curved and flat engaging surfaces of such connections.

3. In a vehicle structure having frame means and front wheels, upper and lower swingable suspension arms pivotally connected at their outer ends at vertically spaced points to each wheel, means for pivotally connecting the inner end of each lower suspension arm to the frame means, means for pivotally connecting each upper suspension arm at a point intermediate the ends thereof to the frame means, longitudinal torsional spring means for each wheel, and connecting means for connecting the inner end of each upper suspension arm to the associated torsional spring means thereby to torsionally deflect the latter in response to vertical motion of the wheel, said connecting means comprising a lever arm connected at its inner end to the torsional spring means and at its outer end to the inner end of the upper suspension arm, the inner end of the lever arm having a pivotal connection with the frame means providing for rolling engagement between curved and flat engaging surfaces of such connection.

4. In a vehicle structure having frame means and a front and a rear wheel, longitudinal torsional spring means common to said wheels, rear lever arm means connected at the inner end thereof to the rear of said spring means and at the outer end thereof to the rear wheel, front lever arm means connected at the inner end thereof to the front of said spring means, a vertically swinging lever arm connected at its outer end to the front wheel and pivotally connected intermediate its ends to the frame means to provide for swinging motion of opposite ends of the lever arm in opposite directions in response to vertical motion of the front wheel, and connecting means for connecting the outer end of the front lever arm means to the inner end of said lever arm, said connecting means including a vertical strut and means providing for rolling engagement between curved and flat surfaces at the localities of the upper and lower ends of the strut.

5. In a vehicle structure having frame means and front wheels, upper and lower swingable suspension arms pivotally connected at their outer ends at vertically spaced points to each wheel, means for pivotally connecting the inner end of each lower suspension arm to the frame means, means for pivotally connecting each upper suspension arm at a point intermediate the ends thereof to the frame means, each of said upper suspension arms extending from its outer end in a rearward and angular direction with respect to the lower suspension arm thereby disposing its inner end rearwardly of the wheel axis, longitudinal torsional spring means for each wheel, and connecting means for connecting the inner end of each upper suspension arm to the associated torsional spring means thereby to torsionally deflect the latter in response to vertical motion of the wheel.

6. In a vehicle structure having frame means and front wheels, upper and lower swingable suspension arms pivotally connected at their outer ends at vertically spaced points to each wheel, means for pivotally connecting the inner end of each lower suspension arm to the frame means, means for pivotally connecting each upper suspension arm at a point intermediate the ends thereof to the frame means, the pivotal axis of swinging of each upper suspension arm and the inner end of the latter being disposed rearwardly of the wheel axis, longitudinal torsional spring means for each wheel, and connecting means for connecting the inner end of each upper suspension arm to the associated torsional spring means thereby to torsionally deflect the latter in response to vertical motion of the wheel.

7. In a vehicle structure having frame means and front wheels, upper and lower swingable suspension arms pivotally connected at their outer ends at vertically spaced points to each wheel, means for pivotally connecting the inner end of each lower suspension arm to the frame means, means for pivotally connecting each upper suspension arm at a point intermediate the ends thereof to the frame means, longitudinal torsional spring means for each wheel, and connecting means for connecting the inner end of each upper suspension arm to the associated torsional spring means thereby to torsionally deflect the latter in response to vertical motion of the wheel, said connecting means comprising a lever arm attached at its inner end to said spring means, and a vertical link having a pivotal connection at its lower end with the outer end of the lever arm and having a pivotal connection at its upper end with the inner end of the upper suspension arm inwardly of the frame means.

8. In a vehicle structure having frame means and front and rear wheels, longitudinal torsional spring means, a swinging lever arm connected at its inner end to an end of said spring means and at its outer end to a wheel, and pivotal means for pivotally supporting said connected ends of the torsional spring means and lever arm on the frame means, said pivotal means comprising interconnected members providing for rolling engagement between curved and flat engaging surfaces of said members.

9. In a vehicle structure having frame means and front and rear wheels, longitudinal torsional spring means, a swinging lever arm connected at one end to an end of said spring means and at its opposite end to a wheel, and pivotal means for pivotally supporting said connected ends of the torsional spring means and lever arm on the frame means, said pivotal means comprising interconnected members providing for rolling engagement between curved and flat engaging surfaces of said members.

10. In a vehicle structure having frame means and front and rear wheels, longitudinal torsional spring means, a swinging lever arm connected at its inner end to said spring means and at its outer end to a wheel, the connection between the outer end of the lever arm and wheel including a vertically extending link and an upper suspension lever arm connected thereto and pivotally mounted intermediate its ends on the frame means, and pivotal means connecting adjacent ends of said lever arm and link, said pivotal means comprising interconnected members providing for rolling engagement between curved and flat engaging surfaces of said members.

11. In a vehicle structure having frame means and front and rear wheels, longitudinal torsional spring means, a swinging lever arm connected at its inner end to said spring means and at its outer end to a wheel, the connection between the outer end of the lever arm and wheel including a vertically extending link and an upper suspension lever arm connected thereto and pivotally mounted intermediate its ends on the frame means, and pivotal means connecting adjacent ends of said link and a lever arm and comprising interconnected members providing for rolling engagement between surfaces thereof.

12. In a vehicle structure having spaced frame means and front and rear wheels, a pair of transversely spaced longitudinal torsional spring means, a swinging lever arm connected at its inner end to each spring means and at its outer end to a wheel, the connections between the outer ends of the lever arms and associated wheels including links extending vertically between the frame means and a pair of upper suspension lever arms connected to said links and each pivotally mounted intermediate the ends thereof on the frame means.

13. A vehicle structure according to claim 12 wherein said upper lever arms have outer end connections to the associated wheels and thence extend longitudinally of the vehicle in convergent relation to the connections thereof with said links.

14. A vehicle structure according to claim 12 in which the upper lever arms are connected to said links inwardly of the frame means.

References Cited in the file of this patent

UNITED STATES PATENTS

| | | |
|---|---|---|
| 2,094,824 | Sanford | Oct. 5, 1937 |
| 2,438,352 | Strong | Mar. 23, 1948 |
| 2,490,311 | Rostu | Dec. 6, 1949 |
| 2,512,055 | Dillon | June 20, 1950 |
| 2,555,649 | Krotz | June 5, 1951 |
| 2,596,922 | Thoms | May 13, 1952 |
| 2,607,609 | Allison | Aug. 19, 1952 |
| 2,607,610 | Allison | Aug. 19, 1952 |
| 2,607,611 | Allison | Aug. 19, 1952 |
| 2,687,311 | Nallinger | Aug. 24, 1954 |
| 2,757,376 | Brueder | July 31, 1956 |
| 2,853,310 | Allison | Sept. 23, 1958 |